United States Patent [19]

Sullivan et al.

[11] Patent Number: 4,564,204
[45] Date of Patent: Jan. 14, 1986

[54] SPRAY-SUPPRESSANT MUD FLAP

[76] Inventors: Patrick F. Sullivan, 3645 Glen Oak; Russell R. Wakefield, 5535 Cody, both of Eugene, Oreg. 97405

[21] Appl. No.: 526,436

[22] Filed: Aug. 25, 1983

[51] Int. Cl.$^4$ ............................................. B62D 25/16
[52] U.S. Cl. .......................... 280/154.5 R; D12/185; 280/153 R
[58] Field of Search ............. 280/154.5 R, 153 R, 280/154, 154.5 A; 428/167; D12/185

[56] References Cited

U.S. PATENT DOCUMENTS

| | | | |
|---|---|---|---|
| 2,782,053 | 2/1957 | Long | 280/154.5 R |
| 3,899,192 | 8/1975 | Reddaway | 280/154.5 R |
| 4,372,570 | 2/1983 | Goodall | 280/154.5 R |
| 4,382,606 | 5/1983 | Lightle et al. | 280/154.5 R |
| 4,398,739 | 8/1983 | McKenzie et al. | 280/154.5 R |

FOREIGN PATENT DOCUMENTS

| | | | |
|---|---|---|---|
| 3102805 | 9/1982 | Fed. Rep. of Germany . | |
| 1101143 | 1/1968 | United Kingdom | 280/154.5 R |
| 2084094 | 4/1982 | United Kingdom | 280/154.5 R |

*Primary Examiner*—Joseph F. Peters, Jr.
*Assistant Examiner*—Mark C. Dukes
*Attorney, Agent, or Firm*—Chernoff, Vilhauer, McClung, Birdwell & Stenzel

[57] ABSTRACT

A spray-suppressing surface configuration for mud flaps and other surfaces near the wheels of motor vehicles. Tapered finger-like projections are oriented in parallel with one another, projecting outward from a base surface at an angle a few degrees below the horizontal, when the base portion of the flap is vertical. The projections are arranged in a pattern of overlappingly adjacent rhombic groups arranged in parallel rows which define unobstructed channels for the flow of accumulated fluids received from the wheels of the vehicle, yet suppress splashing and formation of spray as fluid strikes a flap having such a surface configuration. At least the base surface and fingers may be of a flexible moldable material with an adhesion-resistant surface. Flexibility of the finger-like projections permits snow and ice to fall off the flap easily.

11 Claims, 6 Drawing Figures

SPRAY-SUPPRESSANT MUD FLAP

BACKGROUND AND SUMMARY OF THE INVENTION

The present invention relates to improvements in suppression of spray produced by motor vehicles, and particularly to a mud flap having a spray suppressant surface configuration.

As a motor vehicle, for example a large truck, travels on a wet roadway surface, its wheels pick up fluid from the roadway surface, and such fluid is thrown out by the tires in the form of spray. Such fluid, and the splashing and spray resulting therefrom, may originate as rainwater, slush from snow, melting ice, mud, and the like. When this spray is thrown against a solid surface on the vehicle, it may be deflected or spattered into smaller droplets. As droplets rebound from solid surfaces on the vehicle they are likely to be caught by turbulent air surrounding the vehicle, to be carried in various directions, to be splashed against nearby vehicles, or to be suspended as mist, producing annoying or dangerous conditions of poor visibility in the immediate vicinity of such a vehicle. Thus such splash and spray produced by a large moving vehicle is annoying to vehicles following or alongside, and may impede the vision of the drivers of such vehicles or obscure the other vehicles from the driver of such a large vehicle, often leading to collisions between vehicles.

With increasing numbers of vehicles present on the highways, and with highways having greater roadway width, the total amount of fluids likely to be present on the roadway surface and available to be dispersed as spray has increased. This makes the resultant limitations of visibility an increasingly dangerous problem for drivers.

In order to reduce the amount of such splash and spray produced or thrown up in the way of following vehicles, large vehicles are required to have mudflaps hanging behind their wheels. Conventional mudflaps, however, have a relatively hard, generally planar surface facing toward the wheels of a vehicle. Such a large planar surface generally merely deflects and splatters streams of impinging droplets thrown from the wheels of the vehicle, allowing such droplets and spray to be suspended in the air and blown about, and the droplets continue to contribute to mist and spray in the turbulent air surrounding the vehicle.

An improved type of spray-reducing flap is disclosed in Reddaway U.S. Pat. No. 3,899,192, which teaches the provision of a plurality of elongate, resilient blade elements distributed over the surface of a flap. The blade elements project outwardly from the flap, extending generally toward the wheels of a vehicle in random, angular, crossing relationship to each other, to present a tangled mass of such blade elements for the purpose of absorbing and draining away fluid which strikes the flap.

Such a tangled mass of blade elements, however, has been found to retain mud, snow, and ice to an undesirable degree, and once appreciable amounts of mud or ice have been trapped in such a surface it has a much lower efficiency for reducing the amount of spray in the vicinity of the wheel.

It is therefore a primary objective of the present invention to provide for use on a motor vehicle a flap which has an improved capability to receive spray emanating from a vehicle and to convert the spray into a relatively confined fluid stream, rather than a large volume of spray.

It is another principal objective of the present invention to provide an improved spray-suppressant material which is less likely than previously known spray-suppressant materials for vehicle flaps to retain mud, snow, and ice during use.

It is a principal feature of the present invention that is includes a pattern of groups of tapered flexible fingers arranged upon a generally planar base surface, in which the adjacent groups of such flexible fingers define channels along the base surface for carrying away fluid and allowing the fluid to drop upon a road surface, rather than being blown into the air surrounding the vehicle as spray.

It is another feature of the present invention that it provides a pattern of flexible fingers extending from a base surface toward a source of spray and presenting a relatively large surface area upon which spray can impinge at an angle which will result in a minimized amount of fluid rebounding into the air as spray.

It is an important advantage of the present invention that it provides splash suppressing flaps, and materials for use in constructing such flaps, which are less likely than previously known splash-suppressing flaps to retain an accumulation of mud, snow, or ice.

The foregoing and other objectives, features and advantages of the present invention will be more readily understood upon consideration of the following detailed description of the invention taken in conjunction with the accompanying drawings.

DETAILED DESCRIPTION OF THE INVENTION

Figure 1:
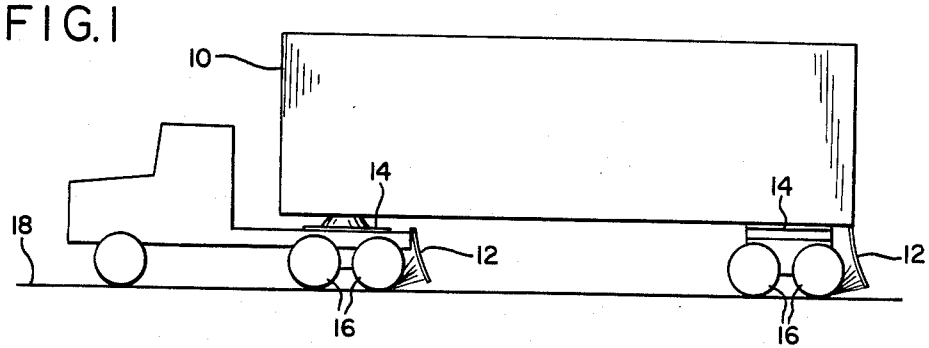
FIG. 1 is a side elevational view of a semi-trailer truck equipped with spray-suppressant flaps which include an exemplary embodiment of the present invention.

Referring now to the drawings, in FIG. 1 a semi-trailer truck 10 is equipped with vertically hanging flaps 12 and horizontally disposed sheets 14 of spray-suppressant material positioned, respectively, behind and above the vehicle wheels 16 to receive and conglomerate spray droplets thrown from the wheels 16 as the vehicle 10 moves in rain or on a wet or slush-covered roadway surface 18. The flaps 12 are suspended from suitable hangers provided on the vehicle 10 to hang generally vertically from a position of attachment rearward of the wheels, and to extend close to the ground behind the wheels, ending, for example, within 4 to 6 inches (10–15 cm) above the ground.

Preferably the flaps 12 embodying the present invention may be manufactured of a moldable flexible material such as rubber. For example, granules of reclaimed tire rubber may be vulcanized and molded into the preferred form. Alternatively, a suitable flexible and resilient plastics material, such as a moldable polyethylene which has an adhesion-resistant surface, is usable for manufacture of the flaps 12.

Figure 2:
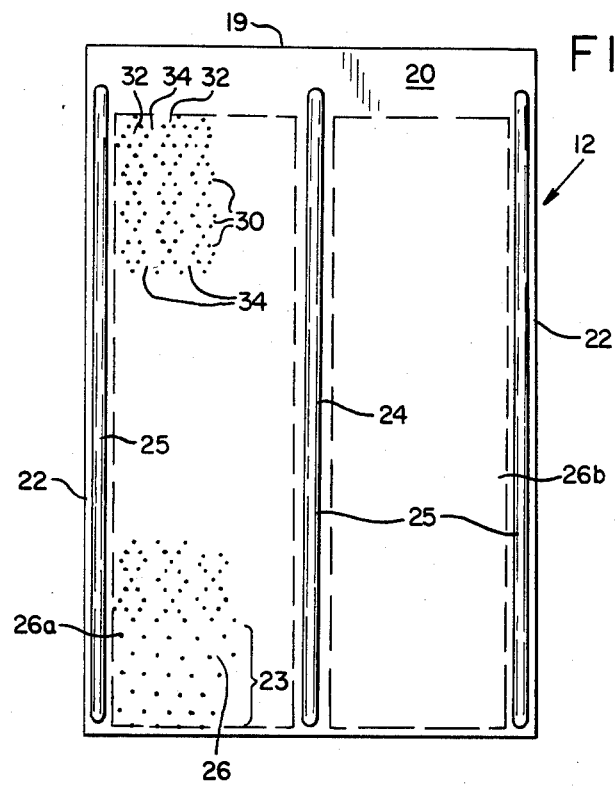
FIG. 2 is a front elevational view of an exemplary spray-suppressant flap such as those shown on the semi-trailer truck shown in FIG. 1, at an enlarged scale.
Figure 3:
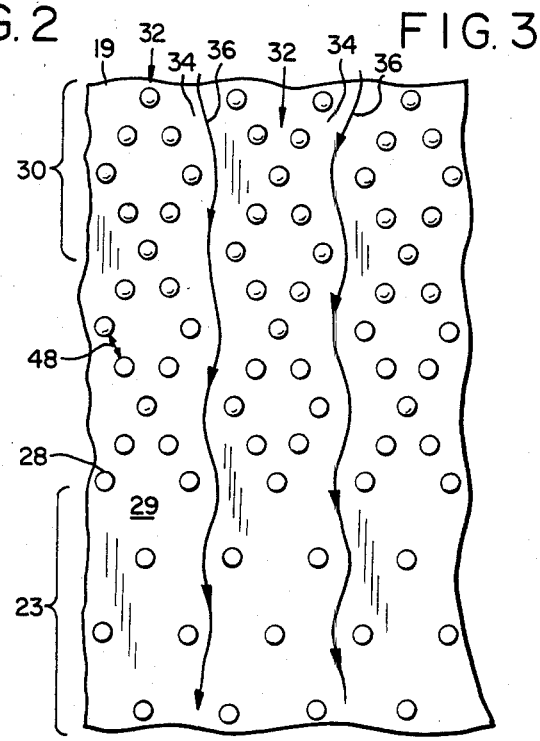
FIG. 3 is a front elevational view of a portion of the spray-suppressant material of the flap shown in FIG. 2, at a further enlarged scale.

A flap 12 in accordance with the present invention preferably has a base sheet 19. As shown at a larger scale in FIG. 2, the flap 12 includes a top margin 20 and lateral margins 22, which have a generally flat surface on the side of the flap 12 which ordinarily faces toward the wheels 16. A lower marginal area 23 is also provided and will be described more fully subsequently. A central portion 24, whose outline is indicated by a broken line, may optionally also have a generally flat surface aligned with the space between dual wheels if the vehicle 10 is so equipped. Additionally, raised ribs 25 may be provided in the central portion 24 and in the lateral margins 22, extending generally vertically along the flap 12 and being, for example, generally semicylindrical, with a radius of approximately $\frac{3}{8}$ inch (0.9 cm). Such ribs 25 may be desired to add stiffness to the flap 12, should it be made of a very flexible material. A spray-suppressing area 26, which may be divided into two subareas 26a and 26b by the optional flat central portion 24 or a rib 25, includes a plurality of flexible fingers 28 extending from a generally flat base surface 29 and arranged preferably in a pattern such as that shown in FIG. 3. Such a pattern consists preferably of a plurality of diamond-shaped or rhombic groups 30, each including eight fingers 28. Vertically adjacent diamond-shaped groups 30 overlap one another, so that one finger 28 is the end of each of two adjacent groups 30. (The pattern of the groups 30 may also be thought of as being single fingers 28 located respectively between vertically adjacent hexagonal groups of six fingers 28.) The adjacent overlapping rhombic groups 30 of fingers 28 define parallel rows 32 of groups 30. Between the rows 32 are channels 34, the groups 30 in each row 32 being staggered longitudinally with respect to the groups 30 in adjacent rows 32 so that the channels 34 are of a zig-zag, rather than straight, configuration, as may be seen in FIGS. 2 and 3. The channels 34 thus extend generally vertically along the spray-suppressing area 26 of the flap 12 when it is hanging as shown in FIG. 1, suspended by attachment of the top margin 20 to the semi-trailer truck 10. This orientation of the flap 12 permits the droplets of fluid which has impinged upon the flap 12 to conglomerate and flow generally downward through the channels 34 as indicated by the arrows 36 in FIG. 3.

In the lower marginal portion 23 of each splash-suppressing area 36, a more open pattern of fingers 28 is provided, giving additional area of base surface 29 between the fingers 28. Such a lower marginal portion 23 may extend over the bottom 3 inches (7.6 cm) of the flap 12, for example, and is provided in order to enhance shedding of snow or ice where its accumulation is otherwise likely to be heaviest.

Figure 4:
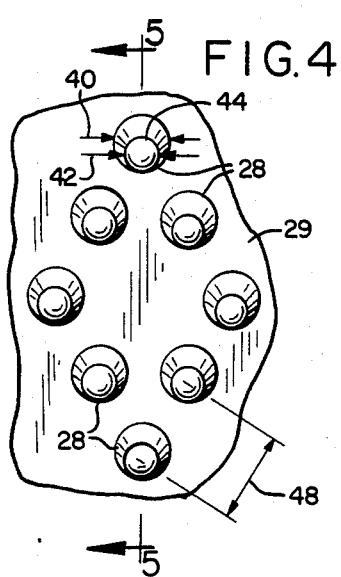
FIG. 4 is a front elevational detail veiw of the flap material shown in FIG. 3 at a yet further enlarged scale.
Figure 5:
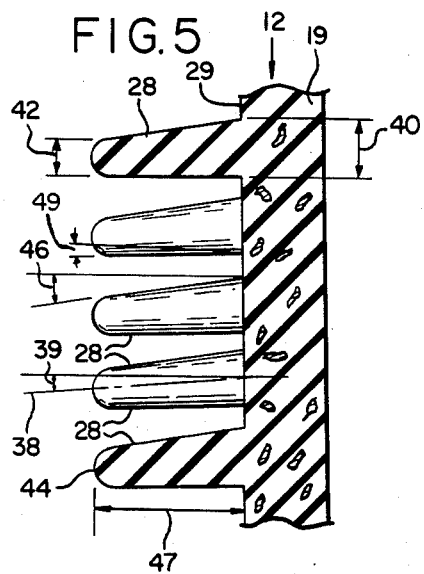
FIG. 5 is a sectional side view of the spray-suppressant flap material shown in FIG. 4, taken along line 5—5.
Figure 6:
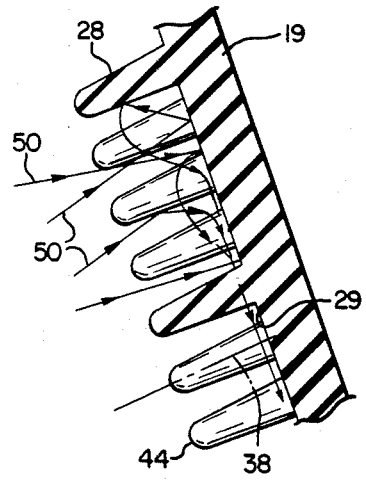
FIG. 6 is a sectional side view similar to that of FIG. 5, but showing the spray-suppressant material inclined rearwardly and showing the manner in which the material performs to control the dispersion of spray received from the wheels of a vehicle.

Referring now additionally to FIGS. 4, 5, and 6, it will be appreciated that the individual fingers 28 are tapered and generally circular in cross section, and also that they are inclined, although in parallel with one another, at an angle of a few degrees away from being perpendicular to the generally planar base surface 29 of the flap 12 between the fingers 28. Ordinarily this inclination away from the perpendicular is directed downward, so that the central axis 38 of each finger extends at an angle 39 of about 2°–15° below the horizontal, when the flap 12 is hanging vertically.

Each finger 28 is tapered, for example, from a diameter 40 (at its base) of approximately 3/16 of an inch (0.47 cm) to a tip diameter 42 of approximately $\frac{1}{8}$ inch (0.3175 cm), with the tip 44 being generally hemispherical. Each finger 28 is preferably inclined slightly downward. For example, the central axis 38 of each finger is about 8° below the horizontal when the flap 12 is hanging vertically. The frustoconical outer surface of each finger defines an angle of about 4° relative to the central axis 38, resulting in the slope of the uppermost surface of each finger preferably being inclined at an angle 46 approximately 12° below horizontal, while the lowermost surface defines an angle 49 of approximately 4° below horizontal.

Each finger 28 has a height 47 which is preferably at least about two-and-a-half times as great as its diameter 40 at its base, so that it is independently flexible along its height, in order to promote shedding of ice and provide additional surface area beyond that of a flat flap of the same size as the flap 12. For example, the fingers 28 may preferably be about $\frac{1}{2}$ inch (1.27 cm) in height. The flexibility provided in this construction permits the fingers 28 to individually absorb some of the kinetic energy of fluid droplets contributing to reduction of the amount of spray associated with a vehicle 10 equipped with flaps 12.

The distance 48 between the central axes 38 of the closest adjacent fingers 28 of each group 30 is preferably about $\frac{1}{4}$ inch (0.6 cm), giving each diamondshaped group 30 a width of $\frac{1}{2}$ inch (1.27 cm) between the central axes of the corner fingers 28, and each channel 34 preferably has the same width. As a result, spray droplets impinging upon the spray-suppressant portion 26 of the flap 12 are likely to encounter the surface of one of the fingers 28 initially, or to be splattered against one of the fingers 28 if they first impinge upon a portion of the flat base surface 29. Such droplets will thereafter agglomerate and be blown or drawn by gravity into one of the channels 34 and drain downward along the channels 34 in the direction indicated by the arrows 36. The fluid can then drain from the lower margin 23 of the flap with a reduced likelihood of being suspended in the air as spray or mist.

When the vehicle 10 is moving forward, creating a considerable amount of relative wind against the forward face of the flap 12, as shown in FIG. 6, the flap 12 is deflected into a rearwardly and downwardly sloping attitude. As a result, the individual fingers 28 are then even more downwardly inclined than when the flap 12 is hanging vertically, presenting more of the surface of the fingers 28 across the predominant paths of movement, indicated by arrows 50, of spray droplets toward the flap 12. Most fluid is deflected or blown toward the base of each finger 28, flowing along the surfaces of the fingers 28 until it reaches the flat base surface 29 and can thereafter drain downwardly through the channels 34. The flat central portion 24 and the lateral margins 22 act as wide channels for fluid flow, in the area where there is likely to be least impingement of spray from the tires of a vehicle such as the semi-trailer truck 10 when it is equipped with side by side dual wheels.

When freezing conditions prevail, the tapered shape and flexibility of the fingers 28 enable an accumulation of snow or ice to fall free from the fingers 28 of its own weight. Because the fingers 28 are more widely separated, the arrangement of fingers 28 in the lower margin 23 helps to shed snow and ice more efficiently from that portion of the flap 12 where it is otherwise most likely to accumulate. When the flap 12 is made of a plastics material which has a generally adhesion-resistant surface such as a molded polyethylene and the like there is even less likelihood of snow, slush, ice, or water sticking to the surface and accumulating.

Because the fingers 28 on the flap 12 are aligned parallel with one another, droplets thrown from the wheels 16 are relatively unobstructed in their paths 50 toward the base surface 29, or impinge upon the surfaces of the fingers 28 at shallow angles. However, when such droplets reach the base surface 29, if they are splattered off it, rebounding onto the surfaces of the fingers 28, they can coalesce and flow along the fingers 28, and then flow downward through the channels 34.

The spray- or splash-suppressant material of the invention may also be provided as sheets 14 located above the wheels 16, oriented horizontally as shown in FIG. 1, with the fingers 28 of such sheets 14 extending downward and being rearward of vertical, so that the generally rearward direction of the relative wind as the vehicle 10 moves forward aids in directing the flow of fluid rearwardly through the channels 34, for eventual downward flow along the flaps 12.

The terms and expressions which have been employed in the foregoing specification ar used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A spray-suppressant material for use on a vehicle to reduce the amount of spray produced by such a vehicle during operation on a wet roadway, comprising:
   (a) a base of flexible material, including a generally flat base surface;
   (b) a plurality of generally parallel elongate flexible fingers extending outwardly from said base surface, each said finger having a base and a central axis, and having a height at least about 2½ times as great as its thickness at its base, said fingers being located on and distributed over said base surface, so as to prevent an increased area in the paths of fluid droplets traveling toward said spray-suppressant material, said plurality of fingers being arranged in a plurality of rhombic groups, said rhombic groups being arranged in parallel rows defining channels between said rows, with said flat base surface within each channel being free from said fingers, and each of said fingers extending from said base in a non-perpendicular direction with the central axis of each said finger defining an angle in the range from about 2° to about 15° from perpendicular to said base surface.

2. The spray-suppressant material of claim 1 wherein each of said fingers is generally frustoconical and has a generally hemispherical tip.

3. The facing material of claim 1 wherein the central axis of each of said fingers is oriented approximately 8° from perpendicular to said base and each of said fingers has a frustoconical outer surface inclined about 4° with respect to said central axis.

4. The facing material of claim 1 wherein each of said fingers has a height about three to four times its thickness adjacent said base surface.

5. A spray-suppressant flap for mounting on a motor vehicle behind the road wheels thereof, comprising:
   (a) a base of flexible material;
   (b) a generally flat base surface located on said base;
   (c) a plurality of generally parallel fingers of flexible material extending outwardly from said base surface and generally parallel with one another, each said finger having a height at least about 2½ times as great as its greatest thickness, said fingers being located on and distributed over said base surface so as to present an increased area in the paths of fluid droplets traveling toward said spray-suppressant material, each of said fingers extending from said base in a non-perpendicular direction;
   (d) supporting means for hangingly attaching said flap to a vehicle in a location rearward of said wheels with said base generally vertical and said fingers extending generally toward the road wheels of said vehicle; and
   (e) said fingers being arranged on said base surface in a plurality of rhombic groups, said rhombic groups being arranged in parallel rows defining channels between said rows, said flat base surface within each channel being free from said fingers, and said channels extending generally vertically along said base surface when said flap is hangingly supported with said base extending generally vertically.

6. The flap of claim 5 wherein each of said fingers is generally frustoconical and has a generally hemispherical tip.

7. The flap of claim 5 wherein each of said fingers has a central axis which is oriented approximately 8° from perpendicular to said base and a frustoconical outer surface inclined at an angle of about 4° relative to said central axis.

8. The flap of claim 5 wherein said flap is of unitary homogeneous construction.

9. The flap of claim 5 wherein said base includes reinforcing fiber material.

10. The flap of claim 5 wherein said flexible material is reprocessed tire rubber and fibers.

11. The flap of claim 5 wherein said flexible material is a plastics material which is resistant to adhesion of ice.

* * * * *

UNITED STATES PATENT AND TRADEMARK OFFICE
CERTIFICATE OF CORRECTION

PATENT NO. : 4,564,204

DATED : January 14, 1986

INVENTOR(S) : Patrick F. Sullivan et al.

It is certified that error appears in the above-identified patent and that said Letters Patent is hereby corrected as shown below:

Col. 5, Line 32      Change "ar" to --are--

Col. 5, Line 51      Change "prevent" to --present--

Signed and Sealed this

Seventh Day of October, 1986

[SEAL]

*Attest:*

DONALD J. QUIGG

*Attesting Officer*    *Commissioner of Patents and Trademarks*